United States Patent
Fann et al.

(10) Patent No.: US 12,541,058 B2
(45) Date of Patent: Feb. 3, 2026

(54) NESTED WAVEGUIDE FAN-OUT STRUCTURE AND METHODS FOR FORMING THE SAME

(71) Applicant: Taiwan Semiconductor Manufacturing Company Limited, Hsinchu (TW)

(72) Inventors: Chun-Hao Fann, New Taipei (TW); Ming Lee, Taipei (TW); Wei-Heng Lin, Taipei (TW); Hsing-Kuo Hsia, Jhubei (TW); Chen-Hua Yu, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 334 days.

(21) Appl. No.: 18/463,522

(22) Filed: Sep. 8, 2023

(65) Prior Publication Data

US 2025/0085474 A1     Mar. 13, 2025

(51) Int. Cl.
*G02B 6/125* (2006.01)
*G02B 6/12* (2006.01)
*G02B 6/13* (2006.01)

(52) U.S. Cl.
CPC ........... *G02B 6/125* (2013.01); *G02B 6/13* (2013.01); *G02B 2006/12119* (2013.01); *G02B 2006/1215* (2013.01)

(58) Field of Classification Search
CPC ................ G02B 6/125; G02B 2006/1215
See application file for complete search history.

(56) References Cited

U.S. PATENT DOCUMENTS 6,259,834 B1 *   7/2001   Shani .............. G02B 6/125
                                              385/24
6,968,104 B2 *  11/2005   Zheng .............. G02B 6/125
                                              385/48

(Continued)

FOREIGN PATENT DOCUMENTS

CN      115016062 A     9/2022
CN      115280227 A    11/2022

(Continued)

OTHER PUBLICATIONS

TW Patent and Trademark Office; TW Application No. 112142334; Office Action mailed Mar. 6, 2025; 10 pages.

*Primary Examiner* — Charlie Y Peng
(74) *Attorney, Agent, or Firm* — The Marbury Law Group, PLLC

(57) ABSTRACT

An optical beam splitter includes a multi-stage nested network of waveguide bifurcation branches, which includes: first-stage waveguide bifurcation branches each including a pair of first-stage waveguide segments, and second-stage waveguide bifurcation branches each including a pair of second-stage waveguide segments. Each pair of first-stage waveguide segments includes a first common end and a pair of first split ends and a pair of first interconnection portions. Each first common end points toward a first widthwise direction. Each pair of second-stage waveguide segments includes a second common end and a pair of second split ends and a pair of second interconnection portions. Each second common end and each second split end of the optical beam splitter point toward a second widthwise direction which is an opposite direction of the first widthwise direction.

20 Claims, 12 Drawing Sheets

(56) References Cited

U.S. PATENT DOCUMENTS

| | | |
|---|---|---|
| 2015/0248787 A1 | 9/2015 | Abovitz et al. |
| 2020/0183198 A1 | 6/2020 | Adams et al. |
| 2024/0094462 A1* | 3/2024 | Lin .................. G02B 6/1228 |

FOREIGN PATENT DOCUMENTS

| | | |
|---|---|---|
| CN | 115356803 A | 11/2022 |
| JP | 2016042115 A | 3/2016 |
| TW | 202238195 A | 10/2022 |

\* cited by examiner

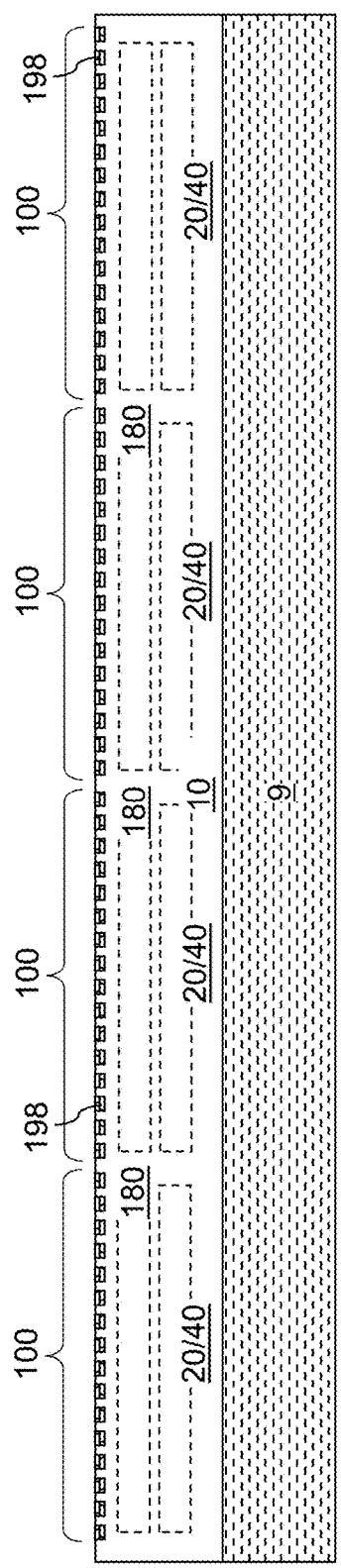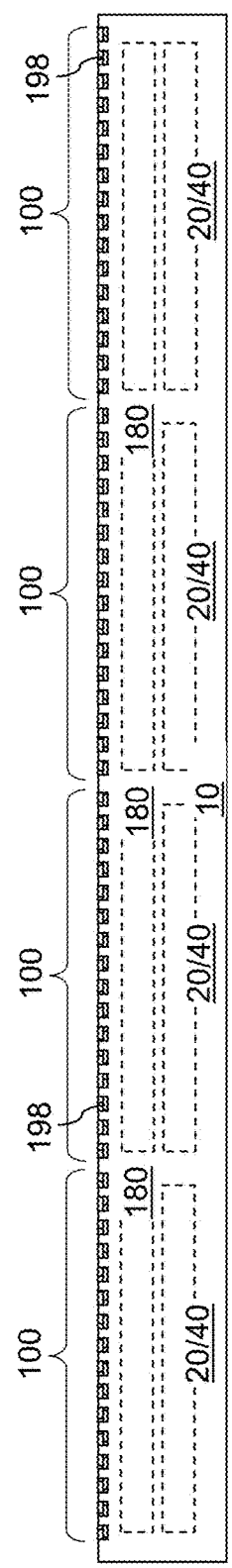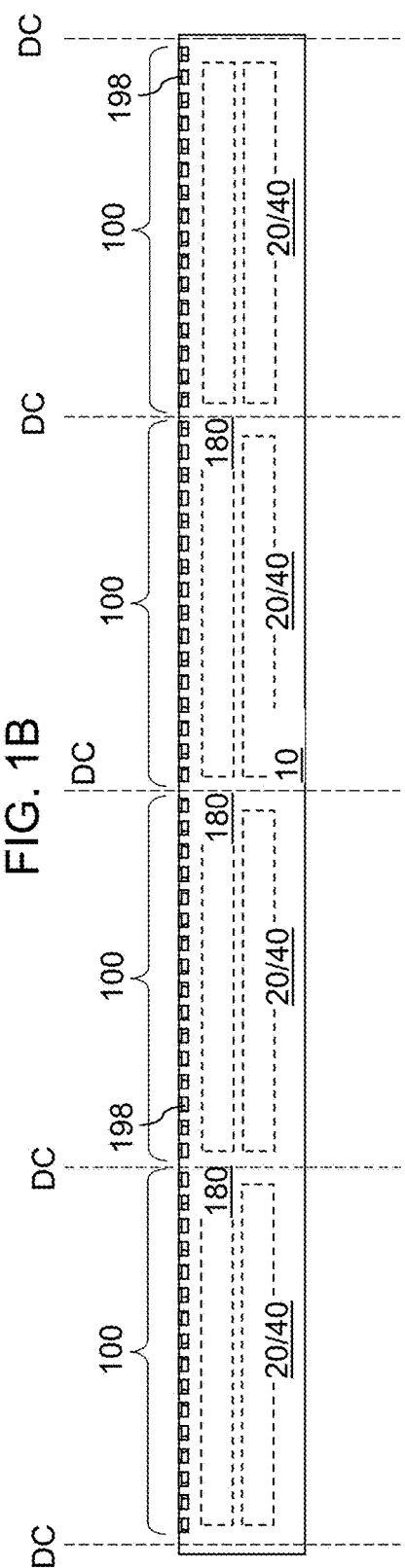

NESTED WAVEGUIDE FAN-OUT STRUCTURE AND METHODS FOR FORMING THE SAME

BACKGROUND

Waveguide fan-out structures for optical devices may occupy a large portion of a device's overall footprint. Reduction of footprint for waveguide fan-out structures is desirable in order to reduce the device's overall footprint.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A-1C are vertical cross-sectional views that illustrate a manufacturing process for forming first dies according to an embodiment of the present disclosure.

DETAILED DESCRIPTION

Figure 1D:
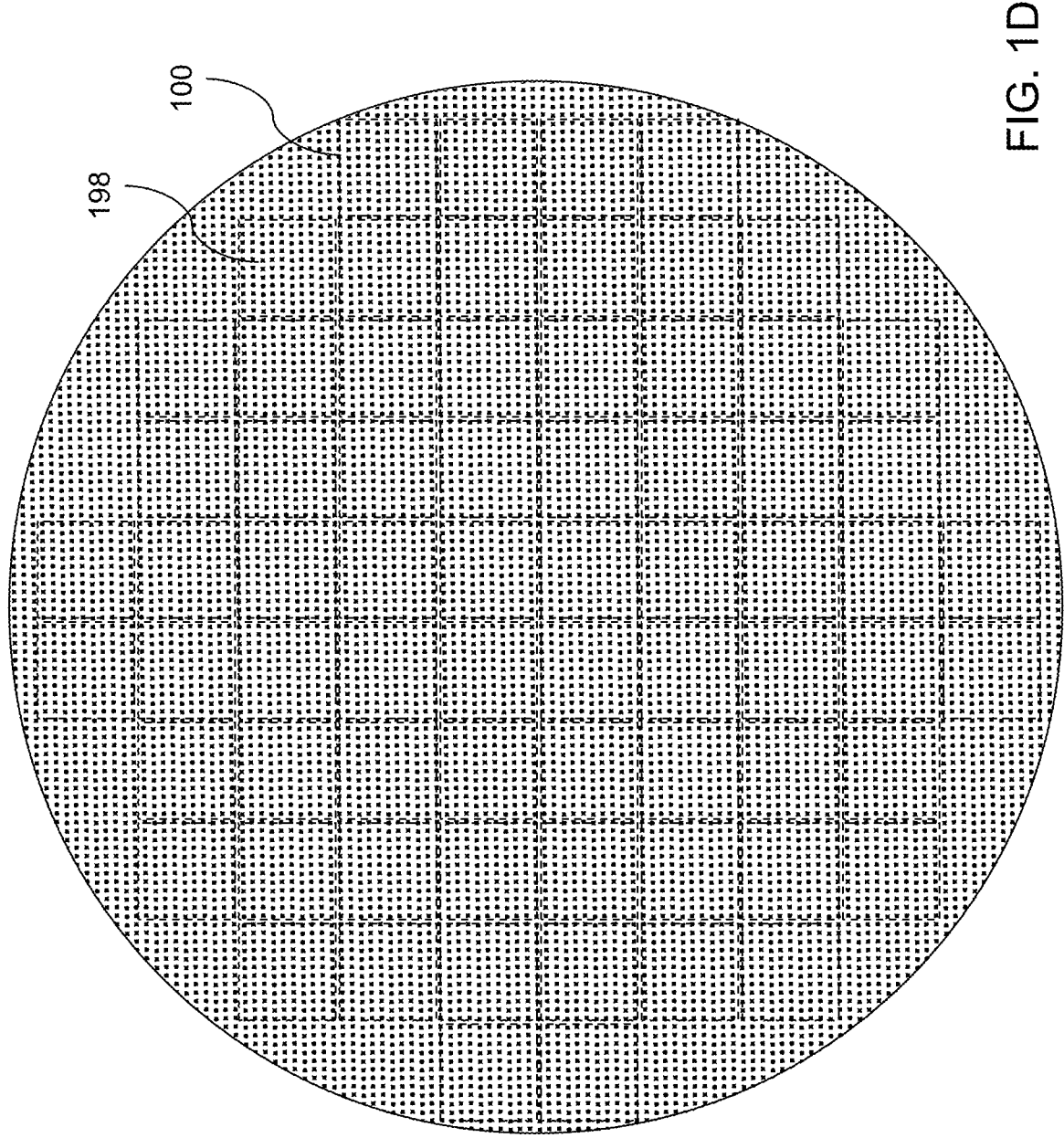
FIG. 1D is a top-down view of the structure of FIG. 1A.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Elements with the same reference numerals refer to the same element, and are presumed to have the same material composition and the same thickness range unless expressly indicated otherwise. As used herein, an element or a system "configured for" a function or an operation or "configured to" provide or perform a function or an operation refers to an element or a system that is provided with hardware, and with software as applicable, to provide such a function or such an operation as described in the present disclosure, and as known in the art in the event any details of such hardware or such software are not expressly described herein.

Embodiments of the present disclosure provide a high channel density waveguide fan-out structure using nested enveloping bifurcation structures. The waveguide fan-out structure may provide optical connection between optical devices and/or optical input/output ports in a configuration in which the waveguide paths envelop connection points with the optical devices and/or the optical input/output ports. Bifurcation structures connected to a lesser number of optical ports or optical devices may be nested within bifurcation structures connected to a greater number of optical ports or optical devices to provide enveloping configurations and to reduce the overall footprint of the waveguide fan-out structure. Various embodiment waveguide fan-out structures disclosed herein may be used to form a compact optical device. The various aspects of the present disclosure are now described with reference to accompanying drawings.

FIGS. 1A-1C are vertical cross-sectional views that illustrate a manufacturing process for forming first dies 100 according to an embodiment of the present disclosure. FIG. 1D is a top-down view the structure of FIG. 1A.

Referring to FIGS. 1A and 1D, a two-dimensional array of first dies 100 may be formed on a carrier substrate 9. The carrier substrate 9 may comprise any substrate that may be subsequently removed. For example, the carrier substrate 9 may comprise a semiconductor substrate, an insulating substrate, or a conductive substrate. Each first die 100 may comprise at least one optical beam splitter 20 and optical devices 40. The optical devices 40 may be any type of optical devices known in the art, and may include one or more of, silicon photonic devices, optical switches, optical amplifiers, optical filters, optical modulators, photodetectors, and non-branching waveguides. An optical beam splitter is a device that may be used to split an incident light beam into two or more separate beams, or may be used to combine two or more separate beams into a superposed output beam. In some embodiments, the two or more separated beams may be split with specific intensity ratios and propagation directions. An optical beam splitter may be used for signal routing, beam combination, interferometry, and optical power distribution. According to an aspect of the present disclosure, the optical beam splitters 20 may be formed with a geometry that provides beam splitting and/or beam combination in a manner that minimizes a lateral extent of each optical beam splitter 20 along a widthwise direction while increasing the areal density of routing within a respective rectangular area that is occupied by a respective optical beam splitter 20. The configurations of the optical beam splitter 20 are subsequently described in detail.

The optical beam splitter 20 and the optical devices 40 may be formed over the carrier substrate 9. First metal interconnect structures 180 may be formed in the first dielectric material layers 10. In some embodiments, a first subset of the first metal interconnect structures 180 may be formed as components of the optical devices 40, and a second subset of the first metal interconnect structures 180 may be used to provide metal wiring for the optical devices 40. First metallic bonding pads 198 may be formed at the top level of the first dielectric material layers 10. The first metallic bonding pads 198 may be configured for metal-to-metal bonding, controlled collapse chip connection (C4) bonding, or microbump bonding (also referred to as C2 bonding).

Referring to FIG. 1B, the carrier substrate 9 may be removed. For example, the carrier substrate 9 may be removed by cleaving the carrier substrate 9 off the assembly of the first dielectric material layers 10 and structures formed therein. Alternatively, the carrier substrate 9 may be removed by backside grinding, polishing, an anisotropic etch process, and/or an isotropic etch process.

Referring to FIG. 1C, the two-dimensional array of first dies 100 may be diced along dicing channels DC to provide multiple first dies 100. Each first die 100 may comprise optical devices 40, at least one optical beam splitter 20, first metal interconnect structures 180, and first metallic bonding pads 198 that are formed within first dielectric material layers 10.

Figure 2A:
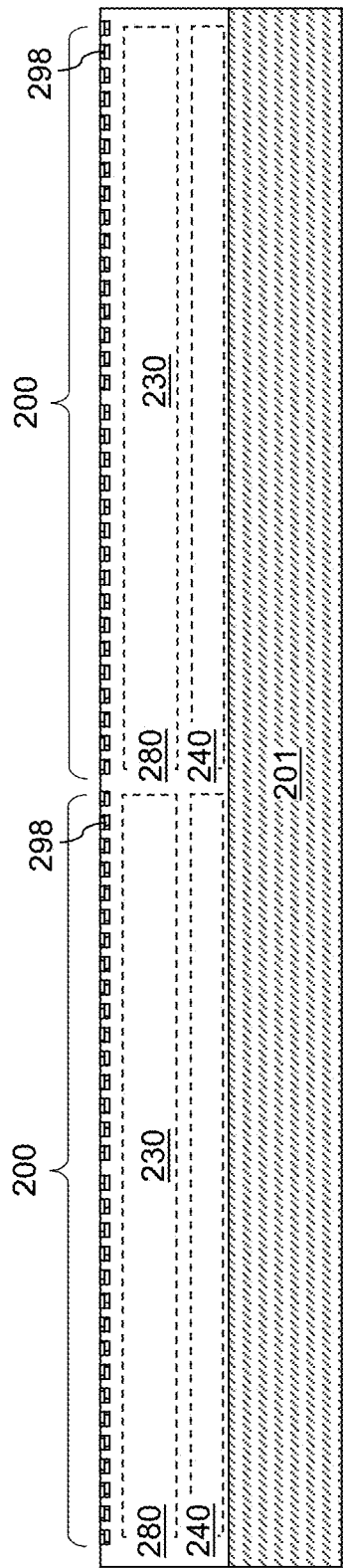
FIGS. 2A and 2B are vertical cross-sectional views that illustrate a manufacturing process for forming second dies according to an embodiment of the present disclosure.
Figure 2B:
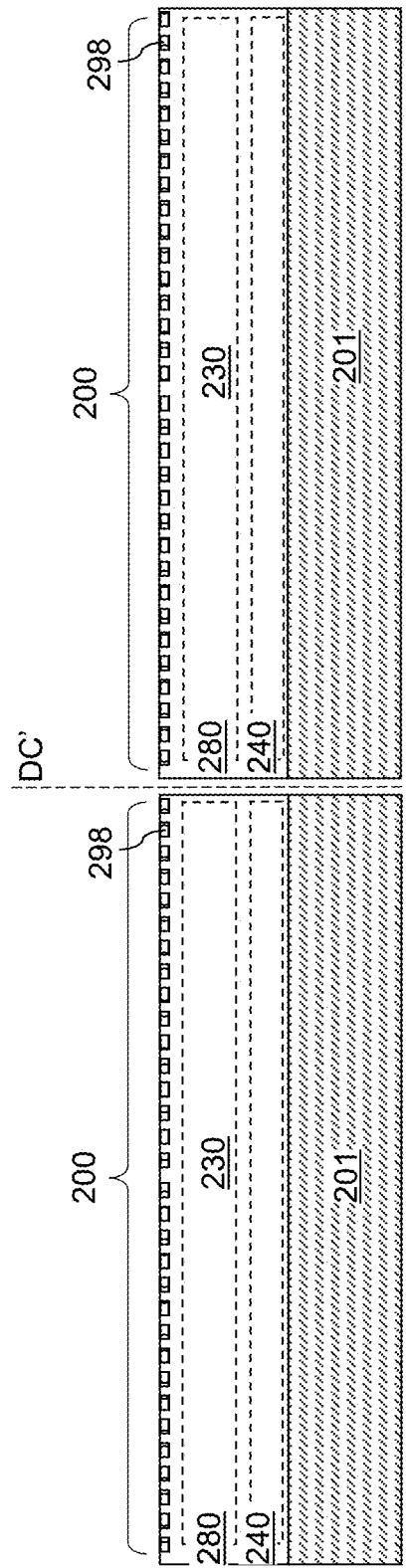

FIGS. 2A and 2B are vertical cross-sectional views that illustrate a manufacturing process for forming second dies 200 according to an embodiment of the present disclosure.

Referring to FIG. 2A, a two-dimensional array of semiconductor dies 200 may be formed on a semiconductor substrate 201. Each semiconductor die 200 comprises a control circuit 240 configured to control operation of optical devices 40 in a first die 100 after bonding. The control circuit 240 may comprise field effect transistors, such as complementary metal-oxide-semiconductor (CMOS) field effect transistors. Each control circuit 240 may comprise a frequency tuner controller circuit and a current switch circuit, which are described in detail in subsequent sections. Further, each second die 200 may comprise second dielectric material layers 230 having formed therein second metal interconnect structures 280. A first subset of the second metal interconnect structures 280 may be used to provide electrical interconnection to and from the field effect transistors of the control circuits 240, and a second subset of the second metal interconnect structures 280 may be used to provide electrical interconnection between the control circuits 240 and a respective set of second metallic bonding pads 298 that are located at the topmost level of the second dielectric material layers 230. A subset of the second metallic bonding pads 298 may have a corresponding pattern to the pattern of first metallic bonding pads 198 in a first die 100. The second metallic bonding pads 298 may be configured for metal-to-metal bonding, controlled collapse chip connection (C4) bonding, or microbump bonding (also referred to as C2 bonding).

Referring to FIG. 2B, the two-dimensional array of second dies 200 may be diced along dicing channels DC' to provide multiple second dies 200. Generally, each second die 200 comprises a control circuit including semiconductor devices 240, second metal interconnect structures 280, and second metallic bonding pads 298 that are formed within second dielectric material layers 230. The control circuit comprises semiconductor devices 240 such as field effect transistors (not expressly shown), and is configured to provide control signals for the optical devices 40 in a first die 100. In one embodiment, each second die 200 includes a semiconductor substrate 201, semiconductor devices 240 located on the semiconductor substrate, second metal interconnect structures 280 formed within second dielectric material layers 230, and second metal bonding pads 298 electrically connected to the second metal interconnect structures 280.

Figure 3:
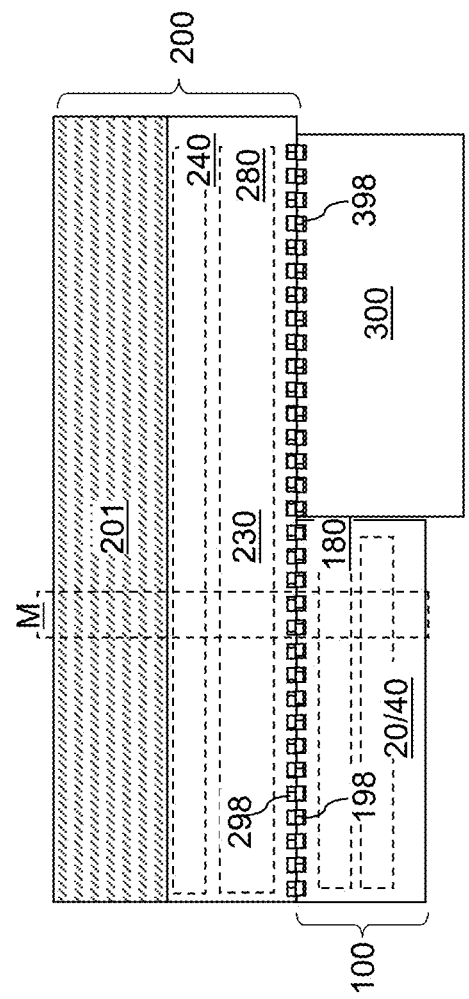
FIG. 3 is a vertical cross-sectional view of a bonded assembly according to an embodiment of the present disclosure.

Referring to FIG. 3, a first die 100 may be attached to a second die 200 by bonding the second metal bonding pads 298 of the second die 200 to the first metal bonding pads 198 of the first die 100. Generally, the first die 100 may be a photonic die comprising optical devices 40 and non-branching waveguides (not expressly shown) for directing propagation paths of photons. Further, the first die 100 comprises at least one optical beam splitter 20 of the present disclosure. The second die 200 comprises a semiconductor die including semiconductor devices such as field effect transistors. The second die 200 comprises a control circuit for controlling operation of the optical devices 40. The control signal may be transmitted across the first die 100 and the second die 200 through electrically conductive paths including a respective bonded pair of a first metallic bonding pad 198 and a second metallic bonding pad 298. While various embodiments may be described such that the second metallic bonding pads 298 are bonded to the first metallic bonding pads 198 via metal-to-metal bonding to provide electrically conductive paths extending across the first die 100 and the second die 200, other embodiments are expressly contemplated herein in which the electrically conductive paths comprise bonding structures including solder balls. Optionally, an additional die, such as a third die 300, may be attached to the second die 200. The third die 300 may comprises a semiconductor die including at least one field effect transistor therein. The third die 300 may comprise a logic die, a memory die, a passive device die, or any other type of semiconductor die. The third die 300 may comprise third metallic bonding pads 398, which are bonded to a subset of the second metallic bonding pads 298 in the second die 200.

FIGS. 4A-4D are sequential vertical cross-sectional views of a region that corresponds to region M in FIG. 3 during a manufacturing process. The manufacturing process illustrated in FIGS. 4A-4D may be used to provide the exemplary structure illustrated in FIG. 1A.

Figure 4A:
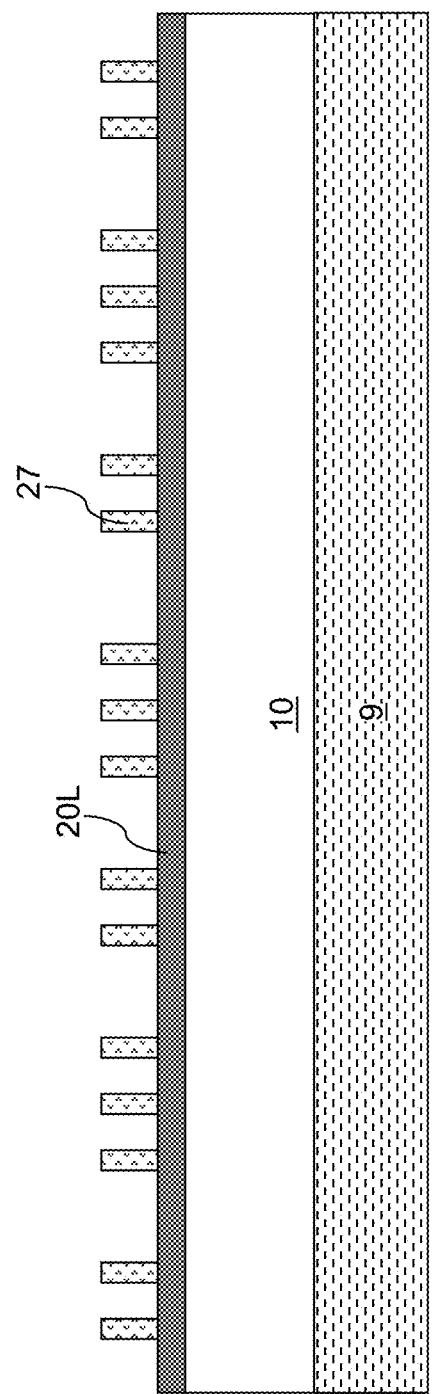
FIGS. 4A-4D are sequential vertical cross-sectional views of a region that corresponds to region M in FIG. 3 during a manufacturing process.
Figure 4B:
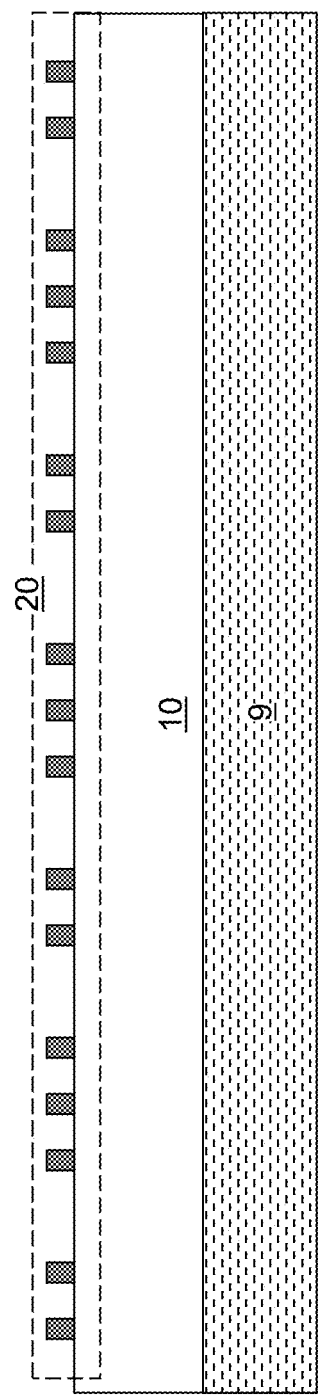

Referring to FIG. 4A, a first dielectric material layer 10 may be formed over a carrier substrate 9. The first dielectric material layer 10 comprises a dielectric material such as silicon oxide. The thickness of the first dielectric material layer 10 may be in a range from 0.5 micron to 10 microns, such as from 1 micron to 5 microns, although lesser and greater thicknesses may also be used.

A waveguide material layer 20L may be deposited over the first dielectric material layer 10 as a blanket material layer having a uniform thickness throughout. The waveguide material layer 20L comprises a material having a higher refractive index than the material of the first dielectric material layer 10. For example, in embodiments in which the first dielectric material layer 10 comprises silicon oxide, the waveguide material layer 20L may comprise silicon or silicon nitride. The thickness of the waveguide material layer 20L may be in a range from 100 nm to 500 nm, although lesser and greater thicknesses may also be used.

A photoresist layer 27 may be applied over the waveguide material layer 20L, and may be lithographically patterned into a pattern of optical beam splitters to be subsequently formed. The pattern of the optical beam splitters are subsequently described in detail.

Figure 5A:
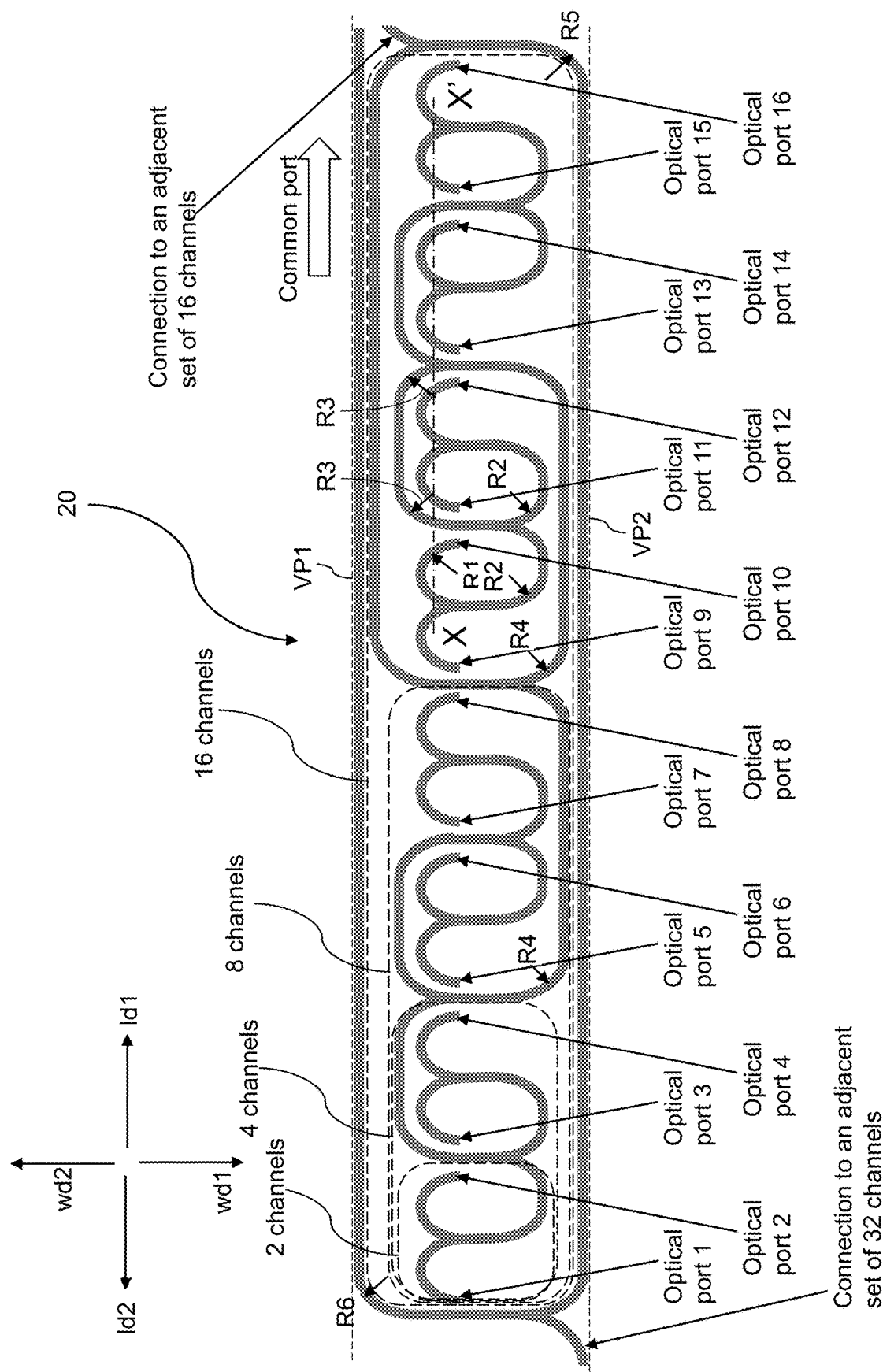
FIGS. 5A-5C are various top-down views of a portion of an optical beam splitter after the processing steps of FIG. 4B. The vertical cross-sectional plane X-X' in FIG. 5A corresponds to the plane of the vertical cross-sectional view of FIG. 4B.
Figure 5B:
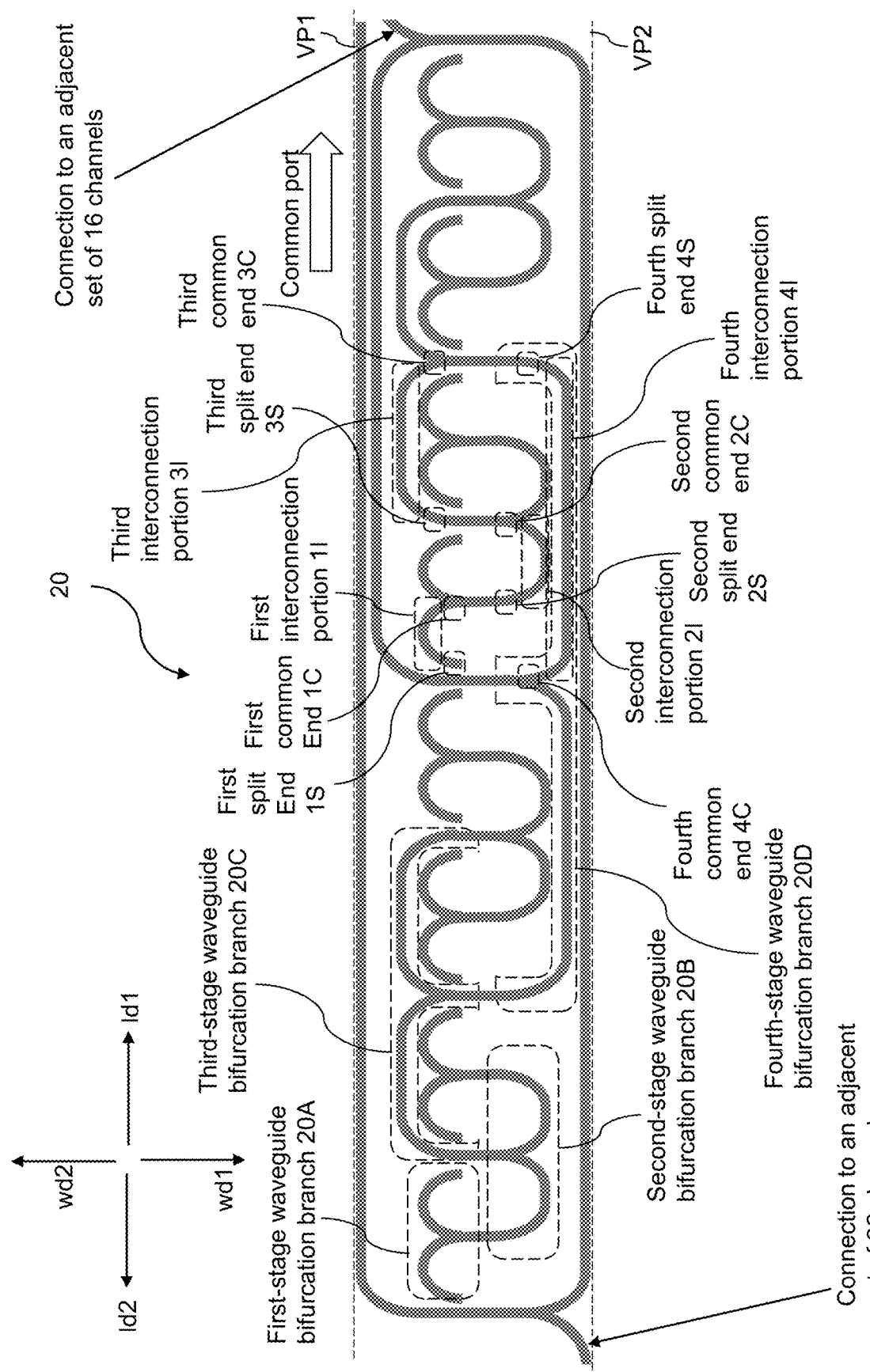
Figure 5C:
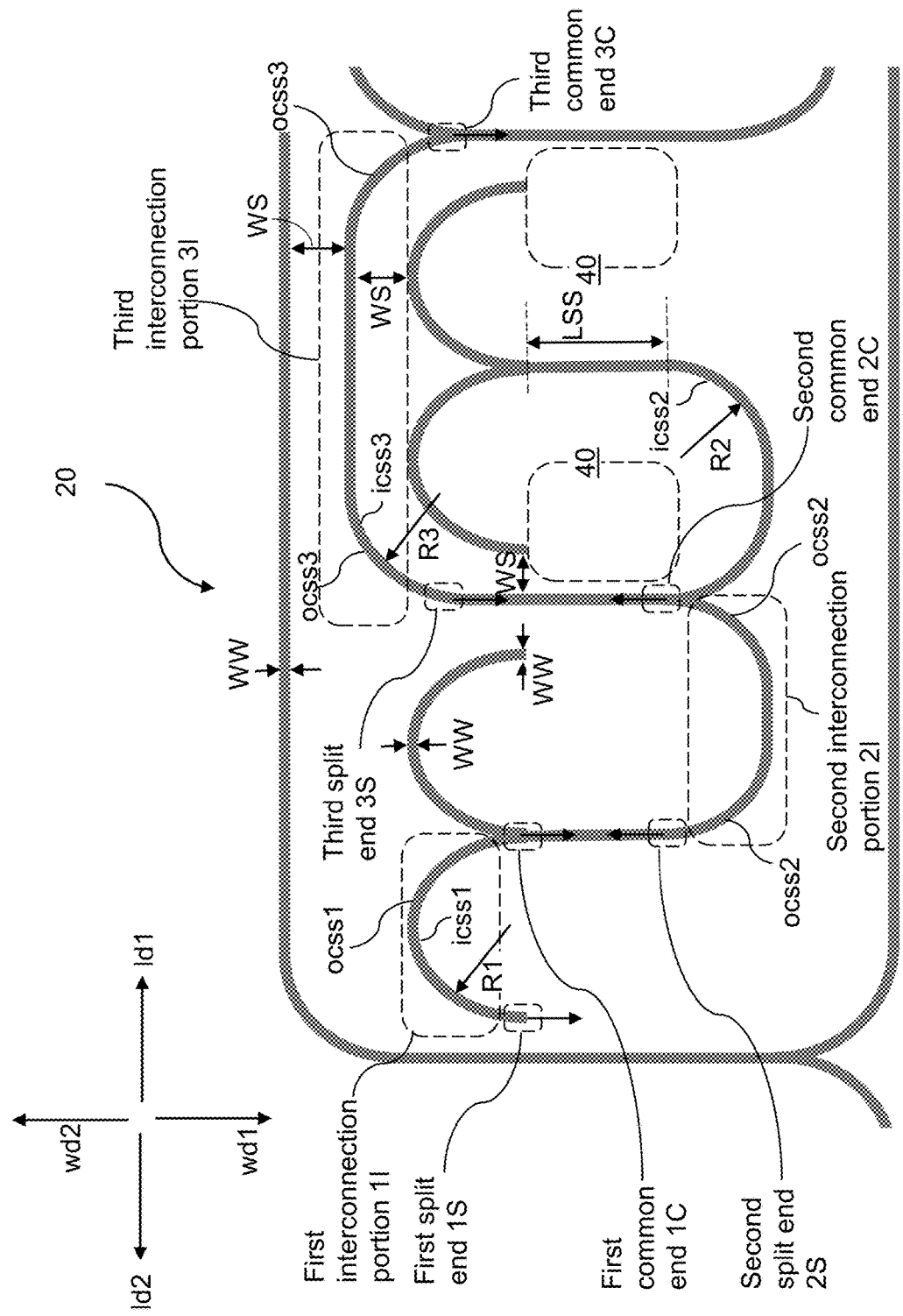

Referring to FIGS. 4B and 5A-5C, the pattern in the photoresist layer 27 may be transferred through to the waveguide material layer 20L by performing an anisotropic etch process. FIGS. 5A-5C are various top-down views of a portion of an optical beam splitter after the processing steps of FIG. 4B. The photoresist layer 27 may be used as an etch mask layer, and the waveguide material layer 20L may be patterned into optical beam splitters 20 and waveguides (not expressly shown). FIG. 5C illustrates locations of optical devices 40 to be formed in a subsequent processing step. The photoresist layer 27 may be subsequently removed, for example, by ashing. The width of various segments of each optical beam splitter 20 may be uniform throughout, and may be in a range from 100 nm to 500 nm, although lesser and greater widths may also be used.

Each optical beam splitter 20 comprises a multi-stage nested network of waveguide bifurcation branches. Thus, the waveguide material layer 20L of FIG. 4A may be formed into a multi-stage nested network of waveguide bifurcation branches. As used herein, a waveguide bifurcation branch refers to a portion of a waveguide structure that includes a bifurcation structure. As used herein, a network of waveguide bifurcation branches refers a plurality of waveguide bifurcation branches that are interconnected as a network. As used herein, a nested network refers to a network having a nested configuration, i.e., a configuration in which an element is located within an area or volume of another element. As used herein, a multi-stage network refers to a network including at least two stages, i.e., a network including at least first interconnections to and from first units and second interconnections to and from second units each including multiple first units.

According to an aspect of the present disclosure, the multi-stage nested network of waveguide bifurcation branches within each optical beam splitter 20 comprises first-stage waveguide bifurcation branches 20A each comprising a pair of first-stage waveguide segments, and second-stage waveguide bifurcation branches 20B each comprising a pair of second-stage waveguide segments. As used herein, a "waveguide segment" refers to a segment of a structure that functions as a waveguide, i.e., a structure that guides optical waves.

Each pair of first-stage waveguide segments comprises a first common end 1C and a pair of first split ends 1S and a pair of first interconnection portions 1I connecting the first common end 1C to a respective first split end 1S within the pair of first split ends 1S. Each first common end 1C and each first split end 1S of the optical beam splitter 20 point to a first widthwise direction wd1 of the optical beam splitter 20. As used herein, an element "points" to a specified direction if a vector representing a propagation direction of the element is parallel to the specified direction.

Each first interconnection portion 1I of the optical beam splitter 20 comprises a respective first outer convex sidewall segment ocss1 that generally faces a second widthwise direction wd2 that is an opposite direction of the first widthwise direction wd1. As used herein, an element "generally faces" a specified direction if the element is observable to an observer located at the specified direction and is not observable to another observer located at an opposite direction of the specified direction. It follows that an element that generally faces a specified direction is physically exposed toward the specified direction.

Each pair of second-stage waveguide segments comprises a second common end 2C and a pair of second split ends 2S and a pair of second interconnection portions 2I connecting the second common end 2C to a respective second split end 2S within the pair of second split ends 2S. Each of the second split ends 2S of the optical beam splitter 20 is connected to a respective first common end 1C of the first-stage waveguide bifurcation branches 20A. Each second common end 2C and each second split end 2S of the optical beam splitter 20 point to the second widthwise direction wd2 of the optical beam splitter 20. In one embodiment, each second interconnection portion 2I of the optical beam splitter 20 comprises a respective second outer convex sidewall segment ocss2 that generally faces the first widthwise direction wd1.

Each pair of third-stage waveguide segments comprises a third common end 3C and a pair of third split ends 3S and a pair of third interconnection portions 3I connecting the third common end 3C to a respective third split end 3S within the pair of third split ends 3S. Each of the third split ends 3S of the optical beam splitter 20 is connected to a respective second common end 2C of the second-stage waveguide bifurcation branches 20B. Each third common end 3C and each third split end 3S of the optical beam splitter 20 point to the first widthwise direction wd1 of the optical beam splitter 20. In one embodiment, each third interconnection portion 3I of the optical beam splitter 20 comprises a respective third outer convex sidewall segment ocss3 that generally faces the second widthwise direction wd2.

Each pair of fourth-stage waveguide segments comprises a fourth common end 4C and a pair of fourth split ends 4S and a pair of fourth interconnection portions 4I connecting the fourth common end 4C to a respective fourth split end 4S within the pair of fourth split ends 4S. Each of the fourth split ends 4S of the optical beam splitter 20 is connected to a respective third common end 3C of the third-stage waveguide bifurcation branches 20C. Each fourth common end 4C and each fourth split end 4S of the optical beam splitter 20 point to the second widthwise direction wd2 of the optical beam splitter 20. In one embodiment, each fourth interconnection portion 4I of the optical beam splitter 20 comprises a respective fourth outer convex sidewall segment that generally faces the first widthwise direction wd1.

Generally, for each integer j that is not greater than the highest stage number K within the optical beam splitter 20, each pair of j-th-stage waveguide segments comprises a j-th common end and a pair of j-th split ends and a pair of j-th interconnection portions connecting the j-th common end to a respective j-th split end within the pair of j-th split ends. Each of the j-th split ends of the optical beam splitter 20 is connected to a respective (j−1)-th common end of the (j−1)-th-stage waveguide bifurcation branches. Each j-th common end and each j-th split end of the optical beam splitter 20 point to the first widthwise direction wd1 if j is an odd number, or to the second widthwise direction wd2 if j is an even number. In one embodiment, each j-th interconnection portion of the optical beam splitter 20 comprises a respective j-th outer convex sidewall segment that generally faces the second widthwise direction wd2 if j is an odd number, or the first widthwise direction wd1 if j is an even number.

According to an aspect of the present disclosure, waveguide segments of multiple stages may be provided within each optical beam splitter 20. In the portion of an optical beam splitter 20 that is illustrated in FIGS. 5A and 5B, the optical beam splitter 20 comprises eight first-stage waveguide segments, four second-stage waveguide segments, two third-stage waveguide segments, and one fourth-stage waveguide segment. Each first-stage waveguide segment includes 2 optical channels that may be connected to 2 optical ports. Each second-stage waveguide segment includes 4 optical channels that may be connected to 4 optical ports. Each third-stage waveguide segment includes 8 optical channels that may be connected to 8 optical ports. Each fourth-stage waveguide segment includes 16 optical channels that may be connected to 16 optical ports. The illustrated fourth-stage waveguide segment may be connected to an adjacent set of 16 optical channels contained within another fourth-stage waveguide segment. The two fourth-stage waveguide segments collectively constitute a fifth-stage waveguide segment that contains 32 optical channels. The fifth-stage waveguide segment may be connected to an adjacent fifth-stage waveguide segment containing additional 32 optical channels. The two fifth-stage waveguide segments constitute a sixth-stage waveguide segment, and so on.

Generally, a j-th stage waveguide segment including $2^j$ optical channels may be provided, and the integer j may be any positive integer that is less than K+1. In this embodiment, $2^K$ optical channels may be provided within the optical beam splitter 20. A common end of the K-th stage waveguide segment may be connected to a common port. The common port may be an optical input port if the optical beam splitter 20 is used to split an input optical beam. Alternatively, the common port may be an optical output port in embodiments in which the optical beam splitter 20 is used in a reverse mode (i.e., a beam-merge mode) to merge optical inputs from the $2^K$ optical ports (which are used as optical input ports) into a single output beam that is provided at the common port.

In one embodiment, each first interconnection portion 1I of the optical beam splitter 20 comprises a respective first inner convex sidewall segment icss1 that generally faces the first widthwise direction wd1. Each first inner convex sidewall segment icss1 may be contained within a segment of a vertical cylindrical surface having a first radius of curvature R1 in a top-down view. The total azimuthal extension angle of each first inner convex sidewall segment icss1 around the center of radius of the respective first inner cylindrical sidewall segment icss1, as seen in a top-down view, may be in a range from 30 degrees to 180 degrees, such as from 60 degrees to 150 degrees, although lesser and greater total azimuthal extension angles may also be used. The first radius of curvature R1 may be in a range from 1 micron to 10 microns, such as from 2 microns to 5 microns, although lesser and greater dimensions may also be used.

In one embodiment, each second interconnection portion 2I of the optical beam splitter 20 comprises a respective second inner convex sidewall segment icss2 that generally faces the second widthwise direction wd2, which is the opposite direction of the first widthwise direction wd1. In one embodiment, each second interconnection portion 2I of the optical beam splitter 20 comprises a respective pair of second outer convex sidewall segment ocss2 that generally faces the first widthwise direction wd1. The pair of second inner convex sidewall segments icss2 of each second interconnection portion 2I may be connected to each other by a straight waveguide segment that extend along a lengthwise direction of the optical beam splitter 20, which may be a first lengthwise direction ld1 or a second lengthwise direction ld2 that is the opposite direction of the first lengthwise direction ld1.

In one embodiment, each curving segment of the first interconnection portions 1I of the optical beam splitter 20 has a respective first inner convex sidewall segment icss1 having a first radius of curvature R1. The total azimuthal extension angle of each first inner convex sidewall segment icss1 around the center of radius of the respective first inner cylindrical sidewall segment icss1, as seen in a top-down view, may be in a range from 30 degrees to 180 degrees, such as from 60 degrees to 150 degrees, although lesser and greater total azimuthal extension angles may also be used. Generally, the total angular propagation direction change within each first interconnection portion 1I of the optical beam splitter 20 is not greater than 180 degrees in the plan view. As used herein, a plan view refers to a view along a vertical direction, which is perpendicular to the first lengthwise direction ld1 and the first widthwise direction wd1. The total angular propagation direction change refers to a total angular change in the propagation direction of a section of a waveguide structure.

Generally, the optical beam splitter 20 is a type of a waveguide structure configured to allow splitting or merging of optical beams. The optical beam splitter 20 may located entirely within a rectangular area located between a first vertical plane VP1 that is perpendicular to the first widthwise direction wd1 and is parallel to the first lengthwise direction ld1 and contacting an outer sidewall of a highest-stage waveguide bifurcation branch, and a second vertical plane VP2 that is parallel to the first vertical plane VP1 and contacting an outer sidewall of a second-highest-stage waveguide bifurcation branch.

Each second inner convex sidewall segment icss2 may be contained within a segment of a vertical cylindrical surface having a second radius of curvature R2 in the top-down view. In one embodiment, the second radius of curvature R2 may be the same as the first radius of curvature R1. The total azimuthal extension angle of each second inner convex sidewall segment icss2, as seen in the top-down view, around the center of radius of the respective second inner cylindrical sidewall segment icss2 may be 90 degrees. Generally, the total angular propagation direction change within each second interconnection portion 2I of the optical beam splitter 20 may be 180 degrees in the plan view.

In one embodiment, each curving segment of the first interconnection portions 1I of the optical beam splitter 20 has a respective first inner convex sidewall segment icss1 having a first radius of curvature R1. In one embodiment, each curving segment of the second interconnection portions 2I of the optical beam splitter 20 has a respective second inner convex sidewall segment icss2 having a second radius of curvature R2. In one embodiment, each of the second interconnection portions 2I of the optical beam splitter 20 comprises a pair of curving segments each having a respective total angular propagation direction change of 90 degrees and a straight segment connecting the pair of curving segments. In one embodiment, each first interconnection portion 1I of the optical beam splitter 20 consists of a respective curving segment.

In one embodiment, an entirety of the multi-stage nested network of waveguide bifurcation branches consists of a single continuous waveguide structure having a uniform height throughout. In one embodiment, each of the first-stage waveguide bifurcation branches 20A has a first lateral extent along a lengthwise direction of the optical beam splitter 20 that is perpendicular to the first widthwise direction wd1; each of the second-stage waveguide bifurcation branches 20B has a second lateral extent along the lengthwise direction of the optical beam splitter 20; and the second lateral extent is greater than the first lateral extent.

In one embodiment, the multi-stage nested network of waveguide bifurcation branches within each optical beam splitter 20 may comprise third-stage waveguide bifurcation branches 20C each comprising a pair of third-stage waveguide segments, fourth-stage waveguide bifurcation branches 20D each comprising a pair of fourth-stage waveguide segments, and so on.

Generally, the optical beam splitter 20 may comprise a multi-stage nested network of waveguide bifurcation branches that comprise, for each of at least two consecutive positive integers i that includes 1 and 2; (2i−1)-th-stage waveguide bifurcation branches each comprising a pair of (2i−1)-th-stage waveguide segments, and 2i-th-stage waveguide bifurcation branches each comprising a pair of 2i-th-stage waveguide segments. The total number L of integers within the at least two consecutive integers i may be 2, 3, 4, 5, 6, 7, 8, 9, 10, etc. If the highest-stage waveguide bifurcation branch within the optical beam splitter 20 is a K-th stage waveguide bifurcation branch, the integer K may be 2L, or may be 2L+1.

Each pair of (2i−1)-th-stage waveguide segments comprises a (2i−1)-th common end and a pair of (2i−1)-th split ends and a pair of (2i−1)-th interconnection portions connecting the (2i−1)-th common end to a respective (2i−1)-th split end within the pair of (2i−1)-th split ends. Each (2i−1)-th common end of the optical beam splitter 20 points toward a first widthwise direction wd1 of the optical beam splitter 20, and each (2i−1)-th interconnection portion of the optical beam splitter 20 comprises a respective (2i−1)-th outer convex sidewall segment that generally faces a second widthwise direction wd2 that is an opposite direction of the first widthwise direction wd1.

Each pair of 2i-th-stage waveguide segments comprises a 2i-th common end and a pair of 2i-th split ends and a pair of 2i-th interconnection portions connecting the 2i-th common end to a respective 2i-th split end within the pair of 2i-th split ends. Each of the 2i-th split ends of the optical beam splitter 20 is connected to a respective (2i−1)-th common end of the (2i−1)-th-stage waveguide bifurcation branches, wherein each 2i-th common end and each 2i-th split end of the optical beam splitter 20 point toward the second widthwise direction wd2 of the optical beam splitter 20.

In one embodiment, for each value of i that is not greater than K/2, each (2i−1)-th interconnection portion of the optical beam splitter 20 comprises a respective (2i−1)-th inner convex sidewall segment icss(2i−1) that generally faces the first widthwise direction wd1. In one embodiment, for each value of i that is greater than 1 and not greater than K/2, each (2i−1)-th interconnection portion of the optical beam splitter 20 comprises a respective pair of (2i−1)-th inner convex sidewall segments icss(2i−1) (such as a pair of third inner convex sidewall segments icss3) that generally faces the first widthwise direction wd1. The pair of (2i−1)-th inner convex sidewall segments icss(2i−1) of each (2i−1)-th interconnection portion may be connected to each other by a straight waveguide segment that extend along a lengthwise direction of the optical beam splitter 20, which may be the first lengthwise direction ld1 or the second lengthwise direction ld2.

For each value of i greater than 1 and not greater than K/2, the total azimuthal extension angle of each (2i−1)-th inner convex sidewall segment icss(2i−1) around the center of radius of the respective (2i−1)-th inner cylindrical sidewall segment icss(2i−1), as seen in the top-down view, may be 90 degrees. Each (2i−1)-th radius of curvature R(2i−1) may be in a range from 1 micron to 10 microns, such as from 2 microns to 5 microns, although lesser and greater dimensions may also be used. In one embodiment, all radii of curvature R(2i−1) may be the same.

In one embodiment, for each value of i that is greater than 1 and not greater than K/2, each 2i-th interconnection portion of the optical beam splitter 20 comprises a respective 2i-th inner convex sidewall segment icss(2i) that generally faces the second widthwise direction wd2. In one embodiment, for each value of i that is not greater than K/2, each 2i-th interconnection portion of the optical beam splitter 20 comprises a respective pair of 2i-th inner convex sidewall segments icss (2i) that generally faces the second widthwise direction wd2. The pair of 2i-th inner convex sidewall segments icss (2i) of each 2i-th interconnection portion may be connected to each other by a straight waveguide segment that extend along a lengthwise direction of the optical beam splitter 20, which may be the first lengthwise direction ld1 or the second lengthwise direction ld2.

For each value of i that is greater than 1 and not greater than K/2, the total azimuthal extension angle of each 2i-th inner convex sidewall segment icss (2i) around the center of radius of the respective 2i-th inner cylindrical sidewall segment icss (2i), as seen in the top-down view, may be 90 degrees. Each 2i-th radius of curvature R(2i) may be in a range from 1 micron to 10 microns, such as from 2 microns to 5 microns, although lesser and greater dimensions may also be used. In one embodiment, all radii of curvature R(2i) may be the same, and may be the same the radii of curvature R(2i−1).

For each value of i not greater than K/2, each (2i−1)-th inner convex sidewall segment icss(2i−1) may be contained within a segment of a vertical cylindrical surface having a (2i−1)-th radius of curvature R(2i−1) in the top-down view. In one embodiment, each curving segment of the (2i−1)-th interconnection portions of the optical beam splitter 20 has a respective (2i−1)-th inner convex sidewall segment icss (2i−1) having a (2i−1)-th radius of curvature R(2i−1). For each value of i greater than 1 and not greater than K/2, the total azimuthal extension angle of each (2i−1)-th inner convex sidewall segment icss(2i−1) around the center of radius of the respective (2i−1)-th inner cylindrical sidewall segment icss1(2i−1), as seen in the top-down view, may be 90 degrees. For each value of i greater than 1 and not greater than K/2, the total angular propagation direction change within each (2i−1)-th interconnection portion of the optical beam splitter 20 may be 180 degrees in the plan view.

For each value of i not greater than K/2, each 2i-th inner convex sidewall segment icss (2i) may be contained within a segment of a vertical cylindrical surface having a 2i-th radius of curvature R(2i) in the top-down view. The total azimuthal extension angle of each 2i-th inner convex sidewall segment icss (2i) around the center of radius of the respective 2i-th inner cylindrical sidewall segment icss (2i), as seen in the top-down view, may be 90 degrees. Generally, the total angular propagation direction change within each 2i-th interconnection portion of the optical beam splitter 20 may be 180 degrees in the plan view.

In one embodiment, for each value of i greater than 1 and not greater than K/2, each curving segment of the (2i−1)-th interconnection portions of the optical beam splitter 20 has a respective pair of (2i−1)-th inner convex sidewall segments icss (2i−1) having a (2i−1)-th radius of curvature R(2i−1). In one embodiment, for each value of i not greater than K/2, each curving segment of the 2i-th interconnection portions of the optical beam splitter 20 has a respective pair of 2i-th inner convex sidewall segments icss (2i) having a 2i-th radius of curvature R(2i). In one embodiment, for each value of i greater than 1 and not greater than K/2, each of the (2i−1)-th interconnection portions of the optical beam splitter 20 comprises a pair of curving segments each having a respective total angular propagation direction change of 90 degrees and a straight segment connecting the pair of curving segments. In one embodiment, for each value of i not greater than K/2, each of the 2i-th interconnection portions of the optical beam splitter 20 comprises a pair of curving segments each having a respective total angular propagation direction change of 90 degrees and a straight segment connecting the pair of curving segments.

In one embodiment, an entirety of the multi-stage nested network of waveguide bifurcation branches consists of a single continuous waveguide structure having a uniform height throughout. In one embodiment, each of the first-stage waveguide bifurcation branches 20A has a first lateral extent along a lengthwise direction of the optical beam splitter 20 that is perpendicular to the first widthwise direction wd1; each of the second-stage waveguide bifurcation branches 20B has a second lateral extent along the lengthwise direction, the second lateral extent being greater than the first lateral extent; and each of the third-stage waveguide bifurcation branches 20C has a third lateral extent along the lengthwise direction, the third lateral extent being greater than the second lateral extent. In one embodiment, the third lateral extent is greater than twice the second lateral extent. In one embodiment, the first lateral extent is greater than one half of the third lateral extent.

In one embodiment, all radii of curvature (R1, R2, R3, R4, R5, R6, etc.) may be the same in the optical beam splitter 20. In one embodiment, the total number of optical ports (which may be input ports or output ports) conned to the first split ends 1S of the first-stage waveguide bifurcation branches 20A may be $2^K$, in which K is an integer greater than 1, and preferably greater than 2. In this embodiment, the lateral extent of the optical beam splitter 20 along a lengthwise direction of the optical beam splitter 20 (such as the first lengthwise direction ld1) may be given approximately by $2^K \times (2 \times R+WW+WS)$, in which WW is the width of a waveguide segment of the optical beam splitter, and WS is the spacing between neighboring pairs of waveguide segments. The lateral extent of the optical beam splitter 20 along a widthwise direction of the optical beam splitter 20 (such as the first widthwise direction wd1) may be given approximately by $2 \times (R+WW)+LSS+(WW+WS) \times (K-2)$, in which LSS is the length of a straight segment connecting a common end of each (j−1)-th stage waveguide bifurcation branch to a split end of a respective j-th stage waveguide bifurcation branch for each integer j that is greater than 1 and not greater than K.

The total number N of optical channels and the total number N of optical ports may be given by $N=2^K$. In this embodiment, $K=\log_2 N$. The lateral extent of the optical beam splitter 20 along the lengthwise direction of the optical beam splitter 20 is given approximately by $N \times (2 \times R+WW+WS)$. Thus, the lateral extent of the optical beam splitter 20 is linearly proportional to the total number of the optical ports. The lateral extent of the optical beam splitter 20 along the widthwise direction of the optical beam splitter 20 (i.e., the lateral distance between the first vertical plane VP1 and the second vertical plane VP2) is given by $2 \times (R+WW)+LSS+(WW+WS) \times ((\log_2 N)-2)$. Therefore, the lateral extent of the optical beam splitter 20 along the widthwise direction of the optical beam splitter 20 increases only logarithmically proportional to the total number of optical ports that are coupled to the optical beam splitter 20 of the present disclosure. Further, the quantity (WW+WS) may be less than R, and thus, the lateral extent of the optical beam splitter 20 along the widthwise direction of the optical beam splitter 20 of various embodiments may be much less than the lateral extent of optical beam splitters using cascading branching configurations as known in the art.

Figure 4C:
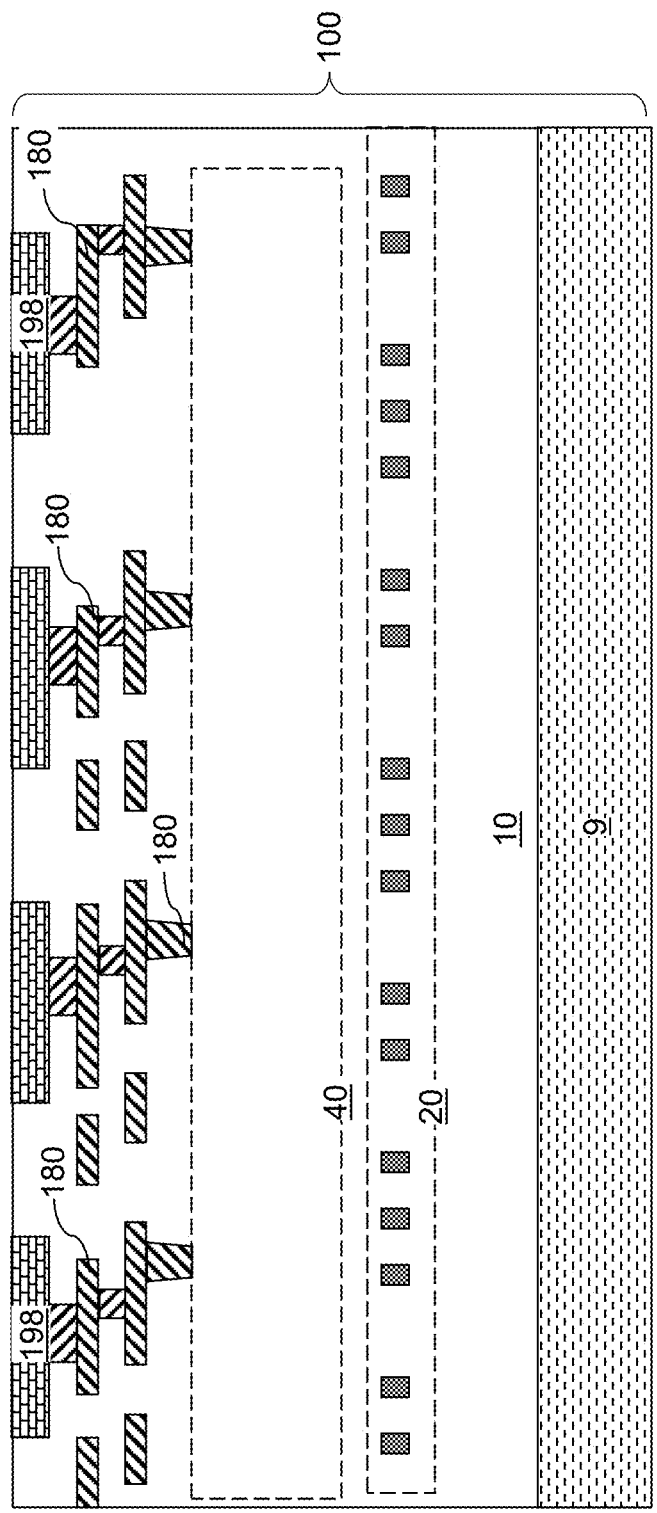

Referring to FIGS. 4C and 5C, optical devices 40 that are optically connected to a respective first split end 1S of the first-stage waveguide bifurcation branches 20A may be subsequently formed. The optical devices 40 may comprise any optical devices known in the art. Generally, the optical devices 40 are optically connected to a respective first split end 1S of the first-stage waveguide bifurcation branches 20A.

First metal interconnect structures 180, first metal bonding pads 198, and additional first dielectric material layers 10 may be formed over the multi-stage nested network. The first metal interconnect structures 180 and the first metal bonding pads 198 are formed within the additional first dielectric material layers 10, and are electrically connected to electrical nodes of the optical devices 40. A first die 100 is provided within each die area.

Generally, a first die 100 may comprises: first dielectric material layers 10 having formed therein the multi-stage nested network of waveguide bifurcation branches; optical devices 40 that are optically connected to a respective first split end 1S of the first-stage waveguide bifurcation branches 20A; and first metal interconnect structures 180 that are electrically connected to electrical nodes of the optical devices 40 and formed within the first dielectric material layers 10. The exemplary structure illustrated in FIG. 1A may be provided at this processing step. Subsequently, the processing steps described with reference to FIGS. 1B and 1C may be performed.

Figure 4D:
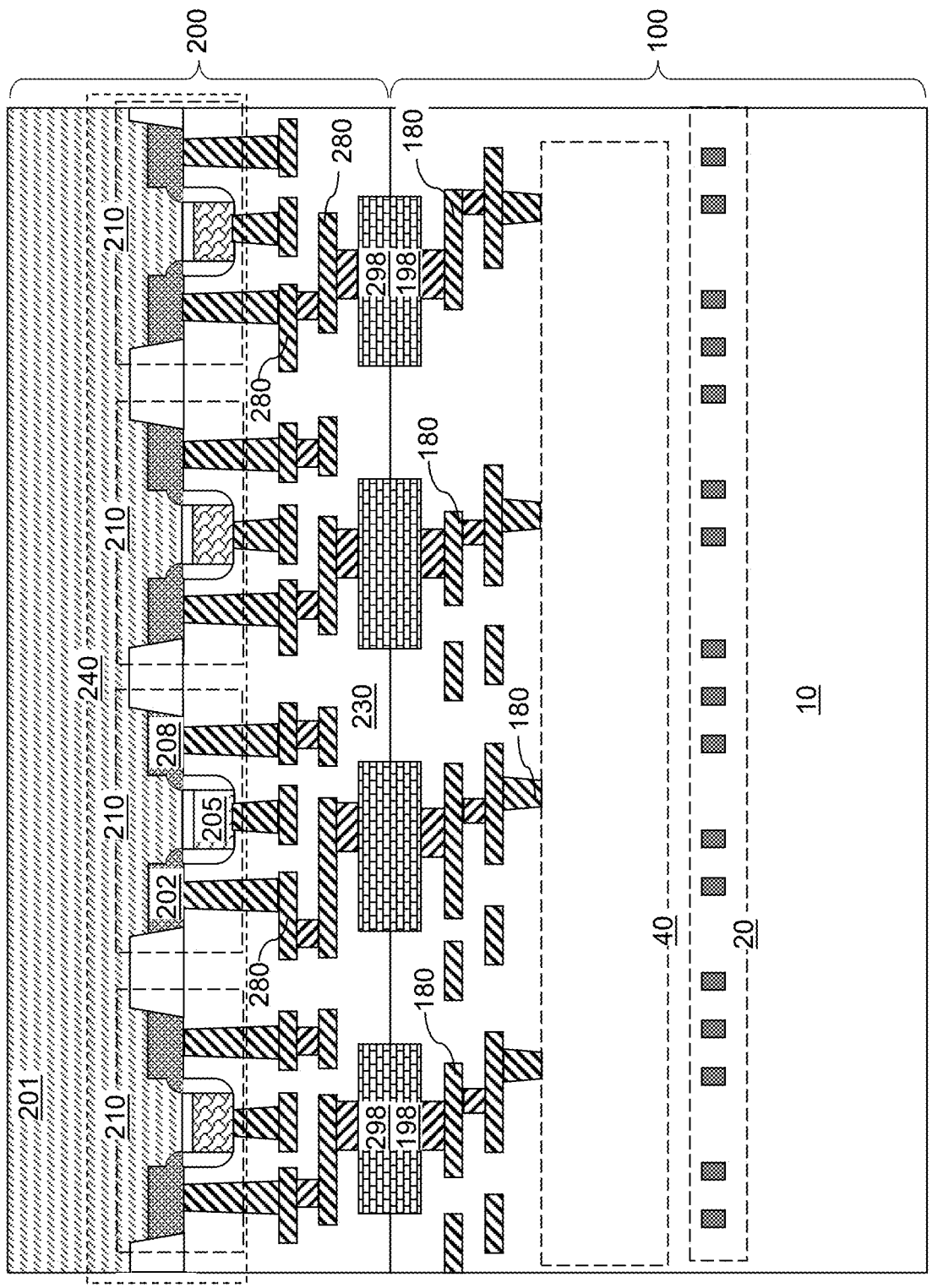

Referring to FIG. 4D, a second die 200 may be provided. The second die 200 may be any type of semiconductor die, such as a system-on-integrated-chip (SoIC) die, a central processor unit, a graphic processor unit, a memory die, etc. The second die 200 may comprise a control circuit 240 including field effect transistors 210 and configured to generate control signals for the optical devices 40 within the first die 100. Each field effect transistor 210 may comprise a respective gate electrode 205, a respective gate dielectric, a respective source region 202, and a respective drain region 208. Generally, the second die 200 comprises a semiconductor substrate 201, a control circuit 240 including field effect transistors 210, second metal interconnect structures 280, and second metallic bonding pads 298 that are formed within second dielectric material layers 230.

The second die 200 may be attached to the first die 100 by bonding the second metal bonding pads 298 to the first metal bonding pads 198 directly by metal-to-metal bonding, or indirectly via an array of solder material portions (such as solder balls). The processing steps described with reference to FIG. 6 may be used.

Figure 6:
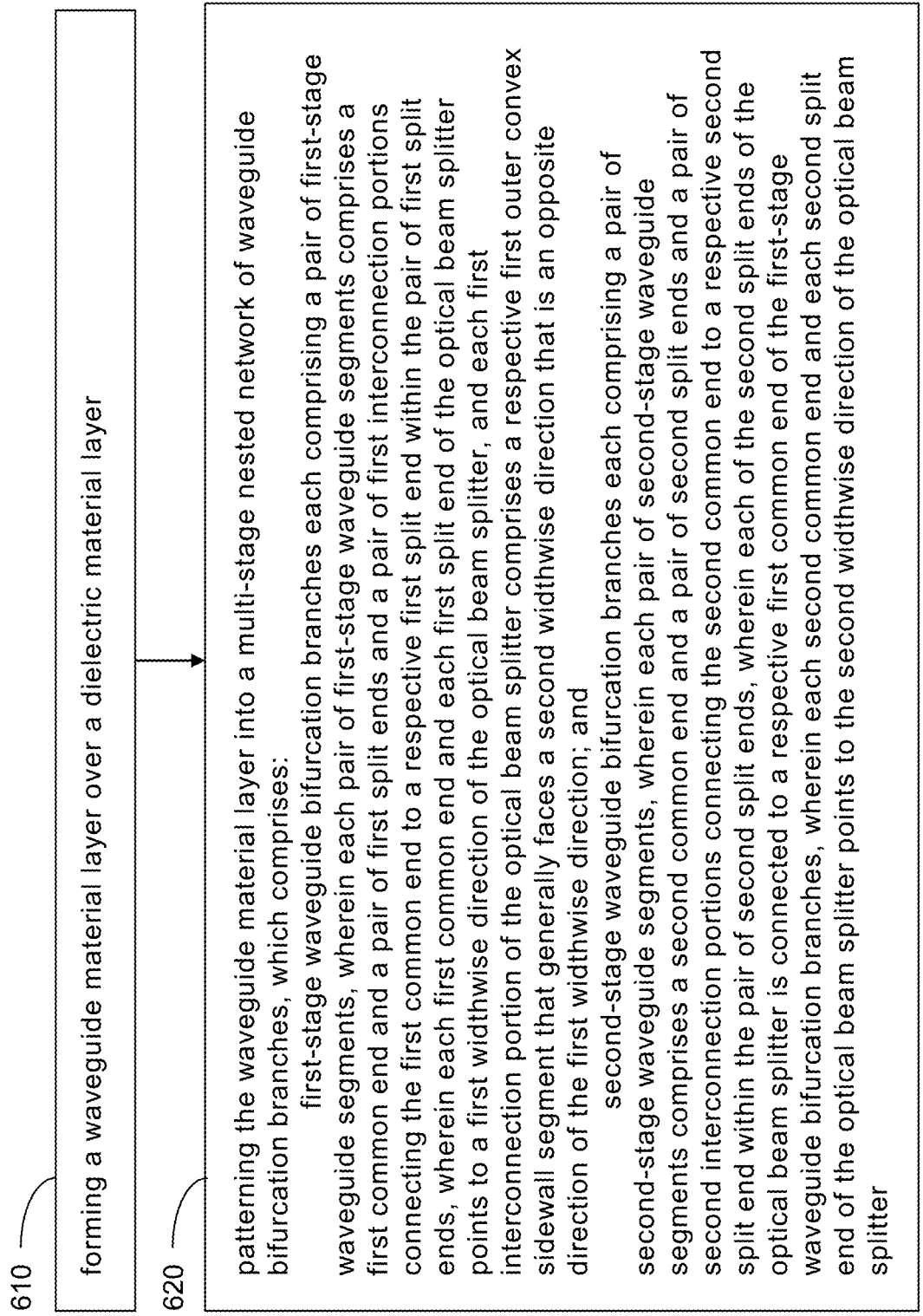
FIG. 6 is a flow chart that illustrates a sequence of processing steps that may be used to manufacture a device structure according to an embodiment of the present disclosure.

FIG. 6 is a flow chart that illustrates a sequence of processing steps that may be used to manufacture a device structure according to an embodiment of the present disclosure.

Referring to step 610 and FIG. 4A, a waveguide material layer 20L may be formed over a dielectric material layer 10.

Referring to step 620 and FIGS. 1A-1C, 2A and 2B, 3, 4B, 4C, and 5A-5C, the waveguide material layer 20L may be patterned into a multi-stage nested network of waveguide bifurcation branches. The multi-stage nested network of waveguide bifurcation branches comprises: first-stage waveguide bifurcation branches 20A each comprising a pair of first-stage waveguide segments, wherein each pair of first-stage waveguide segments comprises a first common end 1C and a pair of first split ends 1S and a pair of first interconnection portions 1I connecting the first common end 1C to a respective first split end 1S within the pair of first split ends 1S, wherein each first common end 1C and each first split end 1S of the optical beam splitter 20 point to a first widthwise direction wd1 of the optical beam splitter 20, and each first interconnection portion 1I of the optical beam splitter 20 comprises a respective first outer convex sidewall segment ocss1 that generally faces a second widthwise direction wd2 that is an opposite direction of the first widthwise direction wd1; and second-stage waveguide bifurcation branches 20B each comprising a pair of second-stage waveguide segments, wherein each pair of second-stage waveguide segments comprises a second common end 2C and a pair of second split ends 2S and a pair of second interconnection portions 2I connecting the second common end 2C to a respective second split end 2S within the pair of second split ends 2S, wherein each of the second split ends 2S of the optical beam splitter 20 is connected to a respective first common end 1C of the first-stage waveguide bifurcation branches 20A, wherein each second common end 2C and each second split end 2S of the optical beam splitter 20 point to the second widthwise direction wd2 of the optical beam splitter 20.

Referring to all drawings and according to various embodiments of the present disclosure, a device structure comprising an optical beam splitter 20 is provided. The optical beam splitter 20 comprises a multi-stage nested network of waveguide bifurcation branches that comprise: first-stage waveguide bifurcation branches 20A each comprising a pair of first-stage waveguide segments, wherein each pair of first-stage waveguide segments comprises a first common end 1C and a pair of first split ends 1S and a pair of first interconnection portions 1I connecting the first common end 1C to a respective first split end 1S within the pair of first split ends 1S, wherein each first common end 1C of the optical beam splitter 20 points toward a first widthwise direction wd1 of the optical beam splitter 20, and each first interconnection portion 1I of the optical beam splitter 20 comprises a respective first outer convex sidewall segment ocss1 that generally faces a second widthwise direction wd2 that is an opposite direction of the first widthwise direction wd1; and second-stage waveguide bifurcation branches 20B each comprising a pair of second-stage waveguide segments, wherein each pair of second-stage waveguide segments comprises a second common end 2C and a pair of second split ends 2S and a pair of second interconnection portions 2I connecting the second common end 2C to a respective second split end 2S within the pair of second split ends 2S, wherein each of the second split ends 2S of the optical beam splitter 20 is connected to a respective first common end 1C of the first-stage waveguide bifurcation branches 20A, wherein each second common end 2C and each second split end 2S of the optical beam splitter 20 point toward the second widthwise direction wd2 of the optical beam splitter 20.

In one embodiment, each second interconnection portion 2I of the optical beam splitter 20 comprises a respective second outer convex sidewall segment ocss2 that generally faces the first widthwise direction wd1. In one embodiment, a total angular propagation direction change within each first interconnection portion 1I of the optical beam splitter 20 is not greater than 180 degrees in a plan view. In one embodiment, each curving segment of the first interconnection portions 1I of the optical beam splitter 20 has a respective first inner convex sidewall segment icss1 having a first radius of curvature R1. In one embodiment, each curving segment of the second interconnection portions 2I of the optical beam splitter 20 has a respective second inner convex sidewall segment icss2 having a second radius of curvature R2. In one embodiment, each of the second interconnection portions 2I of the optical beam splitter 20 comprises a pair of curving segments each having a respective total angular propagation direction change of 90 degrees and a straight segment connecting the pair of curving segments. In one embodiment, each first interconnection portion 1I of the optical beam splitter 20 consists of a respective curving segment.

In one embodiment, an entirety of the multi-stage nested network of waveguide bifurcation branches consists of a single continuous waveguide structure having a uniform height throughout. In one embodiment, the device structure comprises a first die 100 that comprises: first dielectric material layers 10 having formed therein the multi-stage nested network of waveguide bifurcation branches; optical devices 40 that are optically connected to a respective first split end 1S of the first-stage waveguide bifurcation branches 20A; and first metal interconnect structures 180 that are electrically connected to electrical nodes of the optical devices 40 and formed within the first dielectric material layers 10.

In one embodiment, each of the first-stage waveguide bifurcation branches 20A has a first lateral extent along a lengthwise direction of the optical beam splitter 20 that is perpendicular to the first widthwise direction wd1; each of the second-stage waveguide bifurcation branches 20B has a second lateral extent along the lengthwise direction of the optical beam splitter 20; and the second lateral extent is greater than the first lateral extent.

According to another aspect of the present disclosure, a device structure comprising an optical beam splitter 20 is illustrated. The optical beam splitter 20 comprises a multi-stage nested network of waveguide bifurcation branches that comprise, for each of at least two consecutive positive integers i that includes 1 and 2, (2i−1)-th-stage waveguide bifurcation branches each comprising a pair of (2i−1)-th-stage waveguide segments, wherein each pair of (2i−1)-th-stage waveguide segments comprises a (2i−1)-th common end and a pair of (2i−1)-th split ends and a pair of (2i−1)-th interconnection portions connecting the (2i−1)-th common end to a respective (2i−1)-th split end within the pair of (2i−1)-th split ends, wherein each (2i−1)-th common end of the optical beam splitter 20 points toward a first widthwise direction wd1 of the optical beam splitter 20, and each (2i−1)-th interconnection portion of the optical beam splitter 20 comprises a respective (2i−1)-th outer convex sidewall segment that generally faces a second widthwise direction wd2 that is an opposite direction of the first widthwise direction wd1; and 2i-th-stage waveguide bifurcation branches each comprising a pair of 2i-th-stage waveguide segments, wherein each pair of 2i-th-stage waveguide segments comprises a 2i-th common end and a pair of 2i-th split ends and a pair of 2i-th interconnection portions connecting the 2i-th common end to a respective 2i-th split end within the pair of 2i-th split ends, wherein each of the 2i-th split ends of the optical beam splitter 20 is connected to a respective (2i−1)-th common end of the (2i−1)-th-stage waveguide bifurcation branches, wherein each 2i-th common end and each 2i-th split end of the optical beam splitter 20 point toward the second widthwise direction wd2 of the optical beam splitter 20.

In one embodiment, each of the first-stage waveguide bifurcation branches 20A has a first lateral extent along a lengthwise direction of the optical beam splitter 20 that is perpendicular to the first widthwise direction wd1; each of the second-stage waveguide bifurcation branches 20B has a second lateral extent along the lengthwise direction, the second lateral extent being greater than the first lateral extent; and each of the third-stage waveguide bifurcation branches 20C has a third lateral extent along the lengthwise direction, the third lateral extent being greater than the second lateral extent.

In one embodiment, the third lateral extent is greater than twice the second lateral extent. In one embodiment, the first lateral extent is greater than one half of the third lateral extent. In one embodiment, the device structure further comprises optical devices 40 that are optically connected to a respective first split end 1S of the first-stage waveguide bifurcation branches 20A.

Various embodiments disclosed herein may provide compact optical beam splitters 20 having a widthwise lateral extent given by $2 \times (R+WW) + LSS + (WW+WS) \times ((\text{Log}_2 N) - 2)$. The optical beam splitters 20 of the present disclosure thus takes up less device area per optical beam splitter 20, and thus, provides a high-density packing of optical beam splitters 20 and/or formation of additional optical devices 40 adjacent to the optical beam splitter 20. High performance optical beam routing may be provided by the optical beam splitters 20 of various embodiments.

According to an aspect of the present disclosure, the optical ports of the device structures of the present disclosure may be entirely enclosed, i.e., entirely nested inside a network of optical channels, and specifically, inside a multi-stage nested network of waveguide bifurcation branches. Each optical port may be optically coupled to a respective optical device, and may function as a respective optical output port or as a respective optical input port. Thus, photons may be generated, and/or may be captured, between a first horizontal planes including the top surfaces of the various waveguide bifurcation branches and a second horizontal plane including the bottom surfaces of the various waveguide bifurcation branches. Alternatively or additionally, photons may be generated, and/or may be captured, above the first horizontal plane or below the second horizontal plane provided that the photons may be transported to the optical ports via suitable waveguide structures (not shown). In one embodiment, each of the optical ports may be azimuthally enclosed by the multi-stage nested network of waveguide bifurcation branches across an entire azimuthal angle range (i.e., for all azimuthal angle directions ranging 360 degrees in total) such that each straight horizontal path originating from any optical port is blocked by the multi-stage nested network of waveguide bifurcation branches. Thus, each of the optical ports is entirely nested within the multi-stage nested network of waveguide bifurcation branches in all horizontal directions.

The foregoing outlines features of several embodiments so that those skilled in the art may better understand the aspects of the present disclosure. Each embodiment described using the term "comprises" also inherently discloses additional embodiments in which the term "comprises" is replaced with "consists essentially of" or with the term "consists of," unless expressly disclosed otherwise herein. Whenever two or more elements are listed as alternatives in a same paragraph of in different paragraphs, a Markush group including a listing of the two or more elements is also impliedly disclosed. Whenever the auxiliary verb "can" is used in this disclosure to describe formation of an element or performance of a processing step, an embodiment in which such an element or such a processing step is not performed is also expressly contemplated, provided that the resulting apparatus or device can provide an equivalent result. As such, the auxiliary verb "can" as applied to formation of an element or performance of a processing step should also be interpreted as "may" or as "may, or may not" whenever omission of formation of such an element or such a processing step is capable of providing the same result or equivalent results, the equivalent results including somewhat superior results and somewhat inferior results. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device structure comprising an optical beam splitter, wherein the optical beam splitter comprises a multi-stage nested network of waveguide bifurcation branches that comprise:

first-stage waveguide bifurcation branches each comprising a pair of first-stage waveguide segments, wherein each pair of first-stage waveguide segments comprises a first common end and a pair of first split ends and a pair of first interconnection portions connecting the first common end to a respective first split end within the pair of first split ends, wherein each first common end of the optical beam splitter points toward a first widthwise direction of the optical beam splitter, and each first interconnection portion of the optical beam splitter comprises a respective first outer convex sidewall segment that generally faces a second widthwise direction that is an opposite direction of the first widthwise direction; and second-stage waveguide bifurcation branches each comprising a pair of second-stage waveguide segments, wherein each pair of second-stage waveguide segments comprises a second common end and a pair of second split ends and a pair of second interconnection portions connecting the second common end to a respective second split end within the pair of second split ends.

2. The device structure of claim 1, wherein each of the second split ends of the optical beam splitter is connected to a respective first common end of the first-stage waveguide bifurcation branches, wherein each second common end and each second split end of the optical beam splitter point toward the second widthwise direction of the optical beam splitter.

3. The device structure of claim 2, wherein each second interconnection portion of the optical beam splitter comprises a respective second outer convex sidewall segment that generally faces the first widthwise direction.

4. The device structure of claim 1, wherein a total angular propagation direction change within each first interconnection portion of the optical beam splitter is not greater than 180 degrees in a plan view.

5. The device structure of claim 1, wherein:

the first-stage waveguide bifurcation branches comprise optical channels that are connected to optical ports;

each of the optical ports is nested within the multi-stage nested network of waveguide bifurcation branches in all horizontal directions; and each curving segment of the first interconnection portions of the optical beam splitter has a respective first inner convex sidewall segment having a first radius of curvature.

6. The device structure of claim 5, wherein:
each curving segment of the second interconnection portions of the optical beam splitter has a respective second inner convex sidewall segment having a second radius of curvature; and
each of the second interconnection portions of the optical beam splitter comprises a pair of curving segments each having a respective total angular propagation direction change of 90 degrees and a straight segment connecting the pair of curving segments.

7. The device structure of claim 5, wherein each first interconnection portion of the optical beam splitter consists of a respective curving segment.

8. The device structure of claim 1, wherein an entirety of the multi-stage nested network of waveguide bifurcation branches consists of a single continuous waveguide structure having a uniform height throughout.

9. The device structure of claim 8, wherein the device structure comprises a first die that comprises:
first dielectric material layers having formed therein the multi-stage nested network of waveguide bifurcation branches;
optical devices that are optically connected to a respective first split end of the first-stage waveguide bifurcation branches; and
first metal interconnect structures that are electrically connected to electrical nodes of the optical devices and formed within the first dielectric material layers.

10. The device structure of claim 1, wherein:
each of the first-stage waveguide bifurcation branches has a first lateral extent along a lengthwise direction of the optical beam splitter that is perpendicular to the first widthwise direction;
each of the second-stage waveguide bifurcation branches has a second lateral extent along the lengthwise direction of the optical beam splitter; and
the second lateral extent is greater than the first lateral extent.

11. A device structure comprising an optical beam splitter, wherein the optical beam splitter comprises a multi-stage nested network of waveguide bifurcation branches that comprise, for each of at least two consecutive positive integers i that includes 1 and 2:
(2i−1)-th-stage waveguide bifurcation branches each comprising a pair of (2i−1)-th-stage waveguide segments, wherein each pair of (2i−1)-th-stage waveguide segments comprises a (2i−1)-th common end and a pair of (2i−1)-th split ends and a pair of (2i−1)-th interconnection portions connecting the (2i−1)-th common end to a respective (2i−1)-th split end within the pair of (2i−1)-th split ends, wherein each (2i−1)-th common end of the optical beam splitter points toward a first widthwise direction of the optical beam splitter, and each (2i−1)-th interconnection portion of the optical beam splitter comprises a respective (2i−1)-th outer convex sidewall segment that generally faces a second widthwise direction that is an opposite direction of the first widthwise direction; and
2i-th-stage waveguide bifurcation branches each comprising a pair of 2i-th-stage waveguide segments, wherein each pair of 2i-th-stage waveguide segments comprises a 2i-th common end and a pair of 2i-th split ends and a pair of 2i-th interconnection portions connecting the 2i-th common end to a respective 2i-th split end within the pair of 2i-th split ends, wherein each of the 2i-th split ends of the optical beam splitter is connected to a respective (2i−1)-th common end of the (2i−1)-th-stage waveguide bifurcation branches, wherein each 2i-th common end and each 2i-th split end of the optical beam splitter point toward the second widthwise direction of the optical beam splitter.

12. The device structure of claim 11, wherein:
each of the first-stage waveguide bifurcation branches has a first lateral extent along a lengthwise direction of the optical beam splitter that is perpendicular to the first widthwise direction;
each of the second-stage waveguide bifurcation branches has a second lateral extent along the lengthwise direction, the second lateral extent being greater than the first lateral extent; and
each of the third-stage waveguide bifurcation branches has a third lateral extent along the lengthwise direction, the third lateral extent being greater than the second lateral extent.

13. The device structure of claim 12, wherein the third lateral extent is greater than twice the second lateral extent.

14. The device structure of claim 13, wherein the first lateral extent is greater than one half of the third lateral extent.

15. The device structure of claim 11, further comprising optical devices that are optically connected to a respective first split end of the first-stage waveguide bifurcation branches.

16. A method of forming a device structure, the method comprising:
forming a waveguide material layer over a dielectric material layer; and
patterning the waveguide material layer into a multi-stage nested network of waveguide bifurcation branches, which comprises:
first-stage waveguide bifurcation branches each comprising a pair of first-stage waveguide segments, wherein each pair of first-stage waveguide segments comprises a first common end and a pair of first split ends and a pair of first interconnection portions connecting the first common end to a respective first split end within the pair of first split ends, wherein each first common end and each first split end of the optical beam splitter point to a first widthwise direction of the optical beam splitter, and each first interconnection portion of the optical beam splitter comprises a respective first outer convex sidewall segment that generally faces a second widthwise direction that is an opposite direction of the first widthwise direction; and
second-stage waveguide bifurcation branches each comprising a pair of second-stage waveguide segments, wherein each pair of second-stage waveguide segments comprises a second common end and a pair of second split ends and a pair of second interconnection portions connecting the second common end to a respective second split end within the pair of second split ends, wherein each of the second split ends of the optical beam splitter is connected to a respective first common end of the first-stage waveguide bifurcation branches, wherein each second common end and each second split end of the optical beam splitter point to the second widthwise direction of the optical beam splitter.

17. The method of claim 16, further comprising:
forming optical devices that are optically connected to a respective first split end of the first-stage waveguide bifurcation branches; and forming first metal interconnect structures, first metal bonding pads, and additional first dielectric material layers over the multi-stage nested network, wherein the first metal interconnect structures and the first metal bonding pads are electrically connected to electrical nodes of the optical devices, whereby a first die is provided.

18. The method of claim 17, further comprising:

providing a second die including a semiconductor substrate, semiconductor devices located on the semiconductor substrate, second metal interconnect structures firmed located within second dielectric material layers, and second metal bonding pads electrically connected to the second metal interconnect structures; and attaching the second die to the first die by bonding the second metal bonding pads to the first metal bonding pads.

19. The method of claim 16, wherein an entirety of the multi-stage nested network of waveguide bifurcation branches is formed as a single continuous waveguide structure having a uniform height throughout.

20. The method of claim 16, wherein:

a total angular propagation direction change within each first interconnection portion of the optical beam splitter is not greater than 180 degrees in a plan view; and a total angular propagation direction change within each second interconnection portion of the optical beam splitter is 180 degrees in the plan view.

\* \* \* \* \*